US009682635B2

(12) United States Patent
Miyashita

(10) Patent No.: US 9,682,635 B2
(45) Date of Patent: Jun. 20, 2017

(54) CHARGING CONTROL APPARATUS

(71) Applicant: TOYOTA JIDOSHA KABUSHIKI KAISHA, Toyota-shi, Aichi-ken (JP)

(72) Inventor: Michihiro Miyashita, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 139 days.

(21) Appl. No.: 14/833,292

(22) Filed: Aug. 24, 2015

(65) Prior Publication Data
US 2016/0152155 A1 Jun. 2, 2016

(30) Foreign Application Priority Data

Nov. 27, 2014 (JP) ................................. 2014-240442

(51) Int. Cl.
*H02J 7/00* (2006.01)
*B60L 11/18* (2006.01)
(52) U.S. Cl.
CPC ....... *B60L 11/1851* (2013.01); *B60L 11/1861* (2013.01); *Y02T 10/7005* (2013.01)
(58) Field of Classification Search
CPC .................................................. B60L 11/1851
USPC .......................................................... 320/134
See application file for complete search history.

(56) References Cited

U.S. PATENT DOCUMENTS

| 6,232,744 | B1 * | 5/2001 | Kawai | ....................... | B60K 6/28 |
| | | | | | 180/65.235 |
| 2008/0303529 | A1 * | 12/2008 | Nakamura | ............. | B60K 6/445 |
| | | | | | 324/433 |
| 2009/0195219 | A1 * | 8/2009 | Morita | ................... | B60L 3/0046 |
| | | | | | 320/162 |
| 2012/0133332 | A1 * | 5/2012 | Ogane | ...................... | B60K 6/48 |
| | | | | | 320/134 |
| 2013/0314052 | A1 | 11/2013 | Nomoto | | |
| 2016/0152155 | A1 * | 6/2016 | Miyashita | ........... | B60L 11/1851 |
| | | | | | 320/134 |
| 2016/0167534 | A1 * | 6/2016 | Suzuki | ...................... | B60L 7/10 |
| | | | | | 307/10.1 |

FOREIGN PATENT DOCUMENTS

| JP | 2011-163281 | A | 8/2011 |
| JP | 2012-183915 | A | 9/2012 |
| JP | 2012-186908 | A | 9/2012 |
| WO | 2014/167924 | A1 | 10/2014 |

* cited by examiner

*Primary Examiner* — Suresh Memula
(74) *Attorney, Agent, or Firm* — Sughrue Mion, PLLC

(57) ABSTRACT

In a vehicle has a generator and a secondary battery, when a power storage ratio of the secondary battery becomes less than or equal to a first threshold value, until the power storage ratio becomes a second threshold value, which is greater than the first threshold value, a charging control apparatus sets an upper limit of power generation voltage of the generator other than during deceleration of the vehicle, to be higher than an upper limit of the power generation voltage other than during deceleration of the vehicle when the power storage ratio is greater than the second threshold value. The charging control apparatus is provided with: a changing device configured to change the second threshold value so that the second threshold value approaches the first threshold value when a discharge-charge tendency of the secondary battery based on past data associated with the power storage ratio is a charge tendency.

2 Claims, 5 Drawing Sheets

ACCELERATION

CONSTANT SPEED

DECELERATION

| RECENT PAST VEHICLE STOP RATE | 0% | – | 25% | – | ≧50% |
|---|---|---|---|---|---|
| TIME FACTOR | 60sec. | – | 90sec. | – | 180sec. |

| DISTANT PAST VEHICLE STOP RATE | 0% | – | 20% | – | ≧40% |
|---|---|---|---|---|---|
| TIME FACTOR | 60sec. | – | 90sec. | – | 180sec. |

FIG. 8A   1 to 4 MIN AFTER START
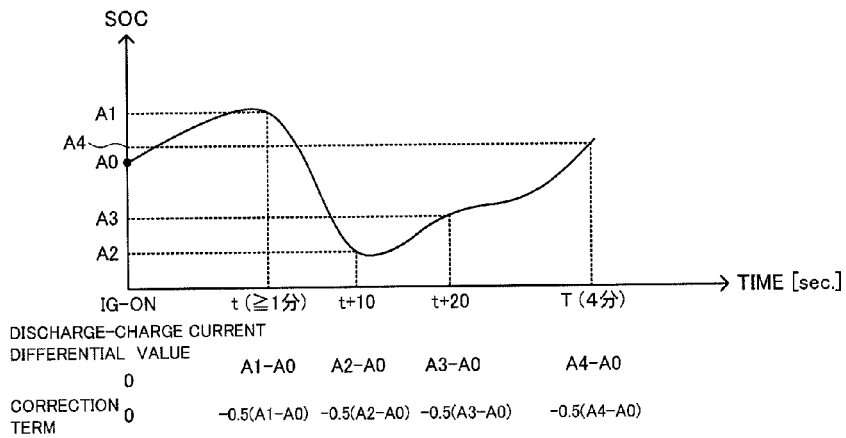
FIG. 8B   4 MIN OR LATER AFTER START
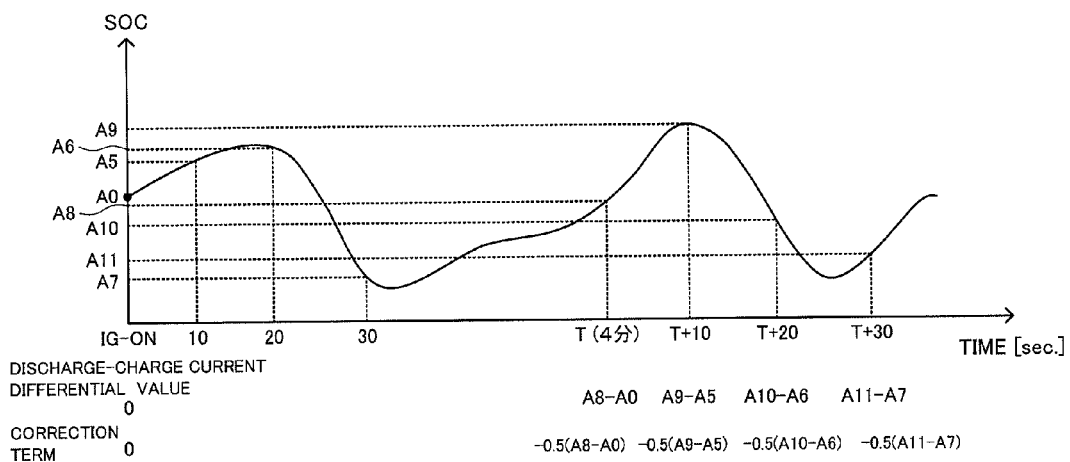
FIG. 9
| CHANGE IN SOC (240sec.) | ≦−1% | −0.5% | ±0% | +0.5% | ≧+1% |
|---|---|---|---|---|---|
| HYSTERESIS WIDTH (OFFSET) | 1.5% | 1.2% | 1.0% | 0.8% | 0.5% |

CHARGING CONTROL APPARATUS

CROSS-REFERENCE TO RELATED APPLICATIONS

This application is based upon and claims the benefit of priority of the prior Japanese Patent Application No. 2014-240442, filed on Nov. 27, 2014, the entire contents of which are incorporated herein by reference.

BACKGROUND OF THE INVENTION

1. Field of the Invention

The present invention relates to a charging control apparatus mounted on a vehicle such as, for example, an automobile.

2. Description of the Related Art

As this type of apparatus, for example, there is proposed an apparatus configured to perform fast charging on a main battery until a charge state of the main battery becomes a predetermined value, which is greater than a predetermined value S1, if the charge state is lower than the predetermined value S1 when a vehicle speed is lower than a predetermined vehicle speed (refer to Patent Literature 1).

Alternatively, there is proposed an apparatus configured to perform forced charge running control in which a hybrid vehicle runs with required torque satisfied while charging a battery, if a control power storage ratio of the battery becomes less than or equal to a charge requiring threshold value in the hybrid vehicle. The forced charge running control is continued until the control power storage ratio becomes a first threshold value S1, which is greater than the charge requiring threshold value. If, however, there is a significant deviation between the control power storage ratio and an actual power storage ratio, the forced charge running control is continued until the control power storage ratio becomes a second threshold value S2, which is greater than the charge requiring threshold value and which is less than the first threshold value S1 (refer to Patent Literature 2).

CITATION LIST

Patent Literature

Patent Literature 1: Japanese Patent Application Laid Open No. 2011-163281

Patent Literature 2: Japanese Patent Application Laid Open No. 2012-183915

In the aforementioned Related Art, the threshold value at which the fast charging or the forced charge running control is ended is constant. Then, in circumstances in which the battery is easily charged such as, for example, in a case where the vehicle goes down a slope, the fast charging or the like is excessively performed, which is technically problematic. On the other hand, in circumstances in which the battery is easily discharged such as, for example, in a case of traffic congestion, a charge amount is possibly insufficient, which is technically problematic.

SUMMARY OF THE INVENTION

In view of the aforementioned problems, it is therefore an object of the present invention to provide a charging control apparatus that can appropriately charge the battery according to circumstances in which the battery is easily charged or discharged.

The above object of the present invention can be achieved by a charging control apparatus mounted on a vehicle provided with a generator and a secondary battery that can store electric power generated by the generator, said charging control apparatus being configured in such a manner that when a power storage ratio, which is a ratio of a power storage amount of the secondary battery to full capacity, becomes less than or equal to a first threshold value, until the power storage ratio becomes a second threshold value, which is greater than the first threshold value, an upper limit of power generation voltage of the generator other than during deceleration of the vehicle is set to be higher than an upper limit of the power generation voltage other than during deceleration of the vehicle when the power storage ratio is greater than the second threshold value, said charging control apparatus is provided with: a changing device configured to change the second threshold value so that the second threshold value approaches the first threshold value when a discharge-charge tendency of the secondary battery based on past data associated with the power storage ratio is a charge tendency.

According to the charging control apparatus of the present invention, the charging control apparatus is mounted on a vehicle provided with a generator and a secondary battery that can store electric power generated by the generator. The generator is configured to generate the electric power by using kinetic energy such as, for example, power outputted from an engine and power from drive wheels. The "generator" may be a generator that is realized in a motor generator; namely, the "generator" may be a generator that is realized as long as it can function as the generator.

When a power storage ratio (e.g. state of charge (SOC)) of the secondary battery becomes less than or equal to a first threshold value, until the power storage ratio becomes a second threshold value, which is greater than the first threshold value, the charging control apparatus sets an upper limit of power generation voltage of the generator other than during deceleration of the vehicle, to be higher than an upper limit of the power generation voltage other than during deceleration of the vehicle when the power storage ratio is greater than the second threshold value Such a configuration makes it possible to relatively early set the power storage ratio of the secondary battery to be the second threshold value.

The "power generation voltage of the generator other than during deceleration of the vehicle" means power generation voltage of the generator when so-called regenerative braking is not performed, such as, for example, during steady running and during acceleration.

According to the study of the present inventor, the following matter has been found. A hysteresis width (or a difference between the "first threshold value" and the "second threshold value" in the present invention) is fixed in many cases between an ON condition (or "that the power storage ratio becomes less than or equal to the first threshold value" in the present invention) and an OFF condition (or "that the power storage ratio reaches the second threshold value" in the present invention) of the control that the secondary battery is actively charged. If, however, the hysteresis width is fixed, the charge amount possibly becomes excessive and fuel efficiency is possibly reduced in circumstances in which the secondary battery is easily charged, such as, for example, in a case where the vehicle goes down a slope. Alternatively, the ON condition is possibly repeatedly satisfied, relatively frequently, in circumstances in which the secondary battery is easily discharged, such as, for example, in a case of traffic congestion.

Therefore, in the present invention, by the changing device, which is provided with, for example, a memory, a processor and the like, the second threshold value is changed (i.e. the hysteresis width is changed) according to a discharge-charge tendency of the secondary battery based on past data associated with the power storage ratio.

Here, the "discharge-charge tendency of the secondary battery based on the past data associated with the power storage ratio" means an index indicating discharge and charge derived from a relation between the power storage ratio of a present time point and the power storage ratio of a predetermined time before (e.g. a difference, a ratio, a proportion, etc.). Specifically, for example, if a value obtained by subtracting the power storage ratio of the predetermined time before from the power storage ratio of the present time point is positive, then, it is specified that the second battery has a charge tendency because the power storage ratio increases. On the other hand, if the value obtained by subtracting the power storage ratio of the predetermined time before from the power storage ratio of the present time point is negative, then, it is specified that the second battery has a discharge tendency because the power storage ratio decreases.

The aforementioned predetermined time (i.e. how past the data to be used is) may be set as follows. A relation between a time difference and the index is obtained by experiments, by experiences, or by simulation, wherein the time difference is between the power storage ratio of the present time point and the power storage ratio to be compared therewith, and the index is derived from the power storage ratio of the present time point and the power storage ratio to be compared therewith. On the basis of the relation, a range of the time difference that can appropriately indicate the discharge-charge tendency of the secondary battery is specified. The predetermined time may be a value in the specified range of the time difference.

The changing device changes the second threshold value so that the second threshold value approaches the first threshold value (i.e. the hysteresis width is reduced) if the discharge-charge tendency of the secondary battery is the charge tendency (i.e. if the secondary battery is easily charged). Alternatively, the changing device changes the second threshold value so that the second threshold value deviates from the first threshold value (i.e. the hysteresis width is increased) if the discharge-charge tendency of the secondary battery is the discharge tendency (i.e. if the secondary battery is easily discharged).

Therefore, according to the charging control apparatus of the present invention, the secondary battery can be appropriately charged according to the discharge charge tendency of the secondary battery.

In one aspect of the charging control apparatus according to the present invention, said changing device changes the second threshold value so that the second threshold value deviates from the first threshold value when the discharge-charge tendency is a discharge tendency.

According to this aspect, the secondary battery can be appropriately charged if the secondary battery has the discharge tendency, which is extremely useful in practice.

The nature, utility, and further features of this invention will be more clearly apparent from the following detailed description with reference to a preferred embodiment of the invention when read in conjunction with the accompanying drawings briefly described below.

BRIEF DESCRIPTION OF THE DRAWINGS

FIG. 8A and FIG. 8B are conceptual diagrams for explaining how to obtain a discharge-charge tendency of a battery; and FIG. 9 is a diagram illustrating one example of a map for defining a relation between a change amount of SOC of the battery and a hysteresis width associated with the damper control.

DETAILED DESCRIPTION OF THE PREFERRED EMBODIMENT

Hereinafter, a charging control apparatus according to an embodiment of the present invention will be explained with reference to the drawings.

Configuration of Charging Control Apparatus

Figure 1:
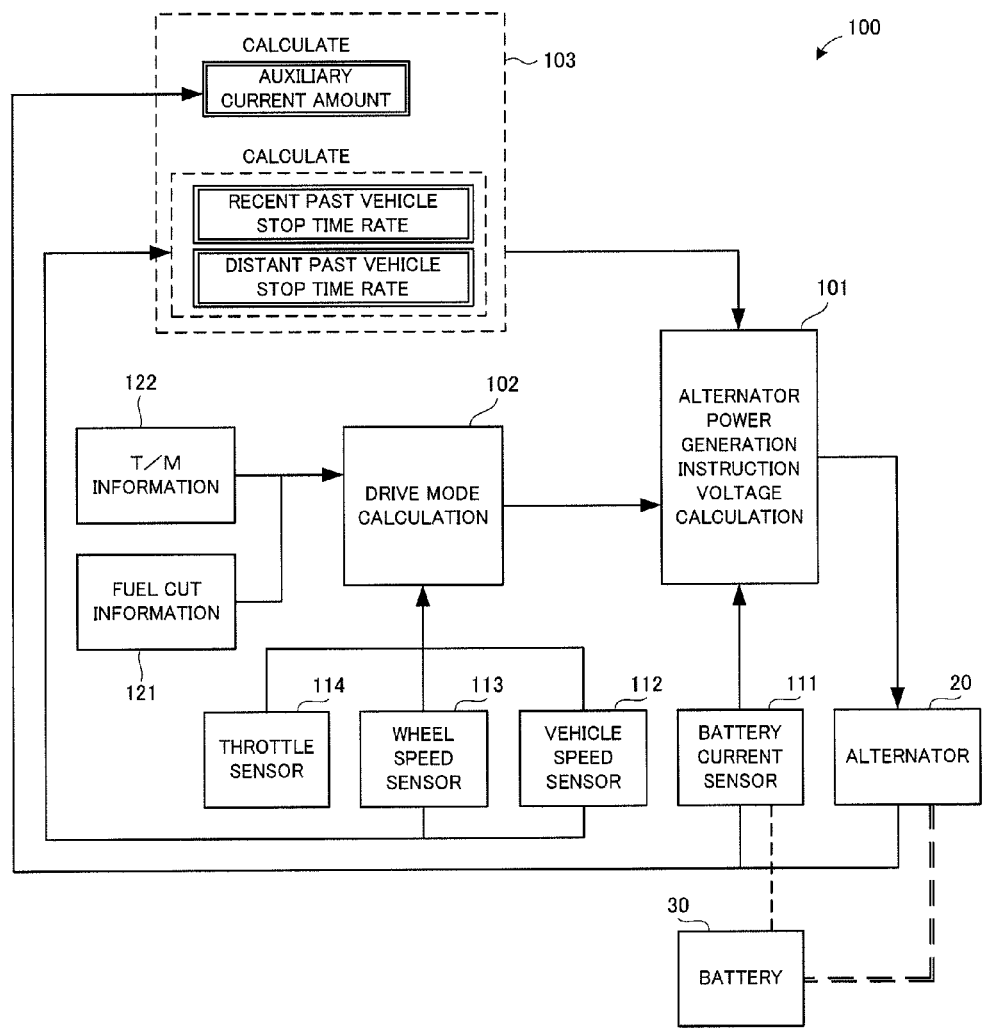
FIG. 1 is a block diagram illustrating a configuration of a charging control apparatus according to an embodiment.

Firstly, a configuration of a charging control apparatus 100 according to the embodiment will be explained with reference to FIG. 1. FIG. 1 is a block diagram illustrating the configuration of the charging control apparatus according to the embodiment.

In FIG. 1, the charging control apparatus 100 is mounted on a vehicle (not illustrated) provided with an alternator 20 and a battery 30 that can store electric power generated by the alternator 20.

The "alternator 20" and the "battery 30" according to the embodiment are respectively one example of the "generator" and the "second battery" according to the present invention. FIG. 1 omits the illustration of a member(s) that is not directly related to the embodiment out of constitutional members of the vehicle on which the charging control apparatus 100 is mounted.

The charging control apparatus 100 is provided with an alternator power generation instruction voltage calculation unit 101, a drive mode calculation unit 102, a calculation unit 103, a battery current sensor 111, a vehicle speed sensor 112, a wheel speed sensor 113, and a throttle sensor 114.

The drive mode calculation unit 102, which is provided with, for example, a memory, a processor, and the like, calculates a drive mode indicating a running state of the vehicle such as, for example, whether the vehicle is during acceleration, or during deceleration, or during constant speed running, on the basis of respective output signals of the vehicle speed sensor 112, the wheel speed sensor 113, and the throttle sensor 114, and on the basis of fuel cut information 121 and transmission (T/M) information 122.

Since various known aspects can be applied to the calculation of the drive mode, an explanation of the details will be omitted.

The calculation unit 103 calculates a recent past vehicle stop time rate and a distant past vehicle stop time, on the basis of the respective output signals of the vehicle speed sensor 112 and the wheel speed sensor 113. Here, the terms "recent past" and "distance past" merely indicate that the "recent past" is a shorter period than the "distance past", in other words, that the "distance past" is a longer period than the "recent past". What degree of period is set for the "recent past" and the "distant past" may be set, as occasion demands.

If the recent past vehicle stop time rate is calculated, the calculation unit 103 calculates, for example, a ratio of a period in which a vehicle speed and a wheel speed are both zero (or are considered to be zero in view of sensor errors) to a period set as the "recent past", on the basis of the respective output signals of the vehicle speed sensor 112 and the wheel speed sensor 113, thereby obtaining the recent past vehicle stop rate.

In the same manner, if the distant past vehicle stop time rate is calculated, the calculation unit 103 calculates, for example, a ratio of the period in which the vehicle speed and the wheel speed are both zero (or are considered to be zero in view of sensor errors) to a period set as the "distant past", on the basis of the respective output signals of the vehicle speed sensor 112 and the wheel speed sensor 113, thereby obtaining the distant past vehicle stop rate.

The calculation unit 103 further calculates an auxiliary current amount, on the basis of a signal indicating a power generation current value of the alternator 20 and an output signal of the battery current sensor 111. Specifically, for example, the calculation unit 103 performs predetermined smoothing (e.g. 15 second smoothing) on a value that is obtained by subtracting a charging current amount of the battery 30 from the power generation current amount of the alternator 20, thereby calculating the auxiliary current amount. If the battery 30 is discharged, a sign of the charging current amount may be set to be negative.

The alternator power generation instruction voltage calculation unit 101 calculates power generation instruction voltage of the alternator 20 on the basis of respective output signals of the drive mode calculation unit 102, the calculation unit 103, and the battery current sensor 111. A specific calculation process will be described later.

The charging control apparatus 100 performs feedback control and damper control, with respect to SOC management of the battery 30. In the embodiment, 5-hour time rate capacitance of the battery 30 is defined as SOC=100%. Moreover, a lower limit of a SOC range used is defined as SOC=0%.

The charging control apparatus 100 performs the following control as the feedback control. During acceleration of the vehicle, in order to suppress power generation, the charging control apparatus 100 sets the power generation instruction voltage of the alternator 20 as a lower limit (e.g. 12.5 V, etc.) of a variation range of the power generation instruction voltage. During deceleration of the vehicle, in order to more actively charge the battery 20 by deceleration regeneration to improve fuel efficiency, the charging control apparatus 100 sets the power generation instruction voltage of the alternator 20 to be relatively high, such as, for example, 14.8 V.

During constant speed running of the vehicle, the charging control apparatus 100 determines the power generation instruction voltage of the alternator 20 so that the product of a feedback control target value and the 5-hour time rate capacitance of the battery 30 approaches an actual discharge-charge current integrated value based on the output signal of the battery current sensor 111. The alternator 20 is controlled on the basis of the determined power generation instruction voltage.

Figure 2:
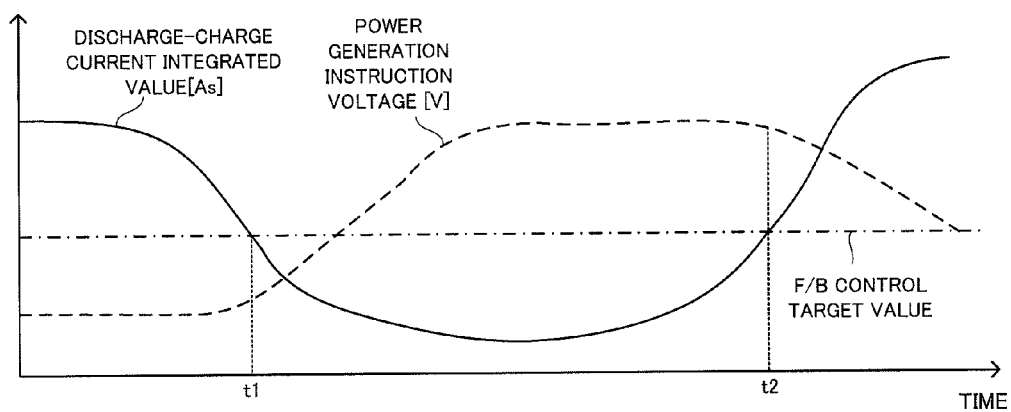
FIG. 2 is a conceptual diagram illustrating a concept of feedback control according to the embodiment.
Figure 3:
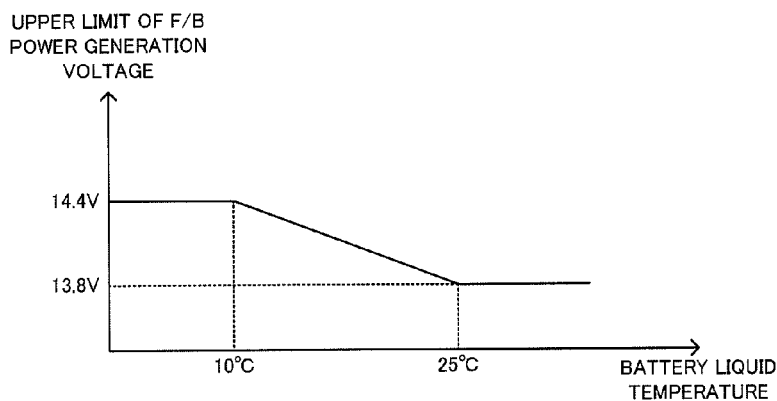
FIG. 3 is a diagram illustrating one example of an upper limit of power generation voltage of an alternator during the feedback control according to the embodiment.

Now, the feedback control will be explained with reference to FIG. 2 and FIG. 3. FIG. 2 shows one example of time variations of the discharge-charge current integrated value and the power generation instruction voltage when the vehicle runs at a constant speed. FIG. 3 is a diagram illustrating one example of upper limit of power generation voltage of the alternator associated with the feedback control when the vehicle runs at the constant speed.

In FIG. 2, until a time point t1, the actual discharge-charge current integrated value (refer to a solid line) is greater than the feedback control target value (refer to an alternate long and short dash line), and the charging control apparatus 100 thus sets the power generation instruction voltage of the alternator 20 (refer to a dashed line) to a relatively low value such as, for example, 12.5 V, in order to bring the discharge-charge current integrated value close to the feedback control target value. This results in an increase in discharge amount of the battery 30, and the discharge-charge current integrated value approaches the feedback control target value.

At a time point slightly after the time point t1, when the actual discharge-charge current integrated value falls below the feedback control target value, the charging control apparatus 100 gradually increases the power generation instruction voltage of the alternator 20 to a relatively high value such as, for example, 13.5 V, in order to bring the discharge-charge current integrated value close to the feedback control target value. This results in an increase in charge amount of the battery 30, and the discharge-charge current integrated value approaches the feedback control target value.

An upper limit of the power generation instruction voltage associated with the feedback control during constant speed running of the vehicle is set according to liquid temperature of the battery 30, for example, as illustrated in FIG. 3.

Not only the aforementioned aspect but also various known aspects can be applied to the feedback control.

Next, the damper control will be explained with reference to FIG. 4 and FIG. 5A to FIG. 5C. The "damper control" according to the embodiment means such control that the battery 30 is actively charged to recover the SOC of the battery 30 if the SOC of the battery 30 falls below a predetermined value.

Figure 4:
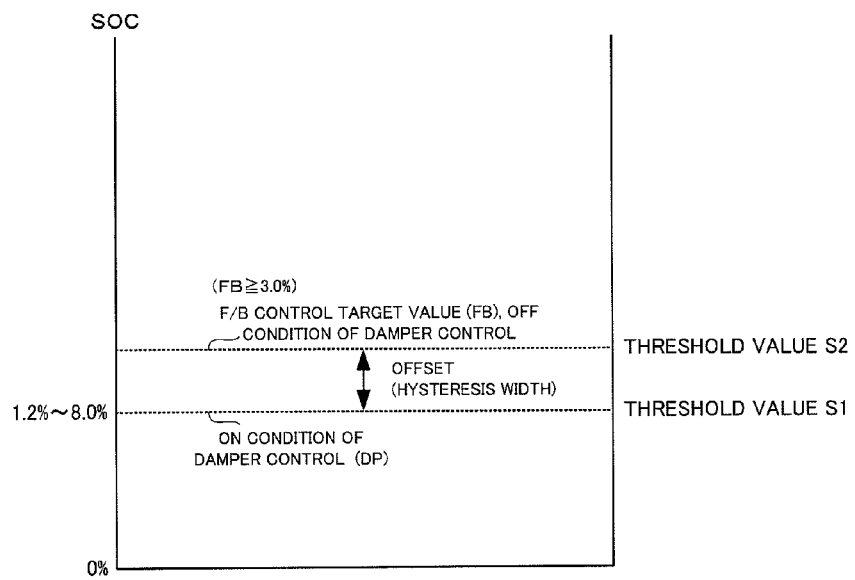
FIG. 4 is a conceptual diagram illustrating a concept of an ON condition and an OFF condition of damper control according to the embodiment.

The charging control apparatus 100 starts the damper control if the SOC of the battery 30 becomes less than or equal to a threshold value S1 (refer to FIG. 4). The charging control apparatus 100 continues the damper control until the SOC of the battery 30 becomes a threshold value S2 (refer to FIG. 4) after becoming less than or equal to the threshold value S1. In other words, the charging control apparatus 100 ends the damper control, on condition that the SOC of the battery 30 becomes less than or equal to the threshold value S1 and is then recovered to the threshold value S2.

When the damper control is performed, the charging control apparatus 100 sets the upper limit of the power generation voltage of the alternator 20 other than during deceleration of the vehicle, to be higher than the upper limit of the power generation voltage of the alternator 20 other than during deceleration of the vehicle when the damper control is not performed.

Figure 5A:
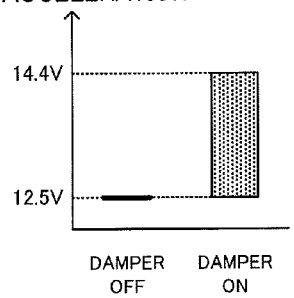
FIG. 5A to FIG. 5C are diagrams illustrating one example of a power generation voltage range of the alternator during each of ON and OFF of the damper control according to the embodiment.
Figure 5B:
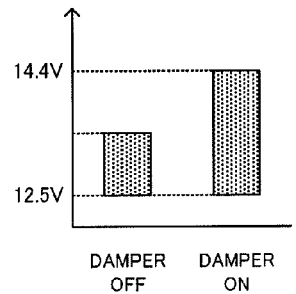
Figure 5C:
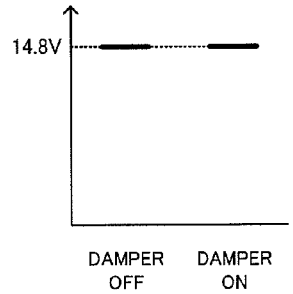

More specifically, as illustrated in FIG. 5A to FIG. 5C, the charging control apparatus 100 increases the upper limit of the power generation voltage of the alternator 20 to, for example, 14.4 V during implementation of the damper control and during acceleration of the vehicle, and sets the power generation instruction voltage of the alternator 20 in a range of 12.5 V to 14.4 V (refer to "DAMPER ON" in FIG. 5A).

Moreover, the charging control apparatus 100 increases the upper limit of the power generation voltage of the alternator 20 to, for example, 14.4 V during implementation of the damper control and during constant speed running of the vehicle, and sets the power generation instruction voltage of the alternator 20 in a range of 12.5 V to 14.4 V (refer to "DAMPER ON" in FIG. 5B).

During deceleration of the vehicle, the charging control apparatus 100 sets the power generation instruction voltage of the alternator 20 to, for example, 14.8 V, regardless of whether or not the damper control is performed (refer to FIG. 5C).

A relatively early recovery of the SOC of the battery 30 due to the damper control makes it possible to suppress, for example, that idle stop control is prohibited due to a decrease in the SOC of the battery 30, thereby improving a fuel consumption effect.

Charging Control Process

Next, a charging control process performed by the charging control apparatus 100 as configured above will be explained with reference to a flowchart in FIG. 6.

Figures 6, 7:
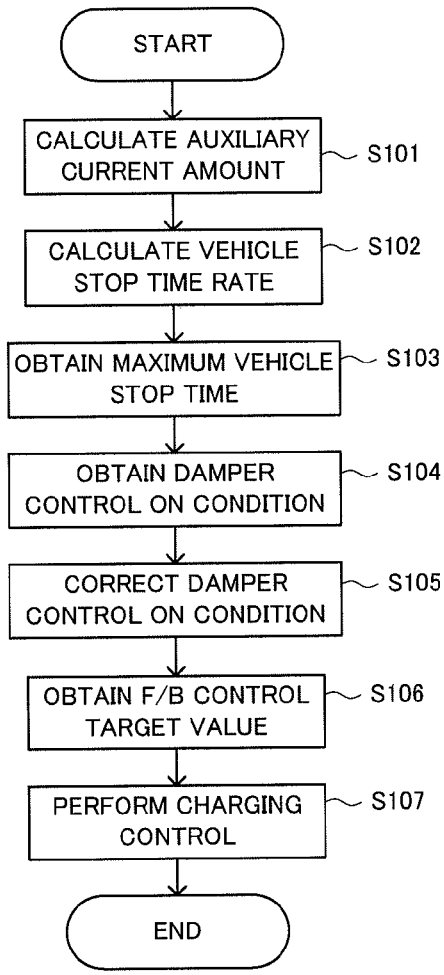
FIG. 6 is a flowchart illustrating a charging control process according to the embodiment.
FIG. 7 is a diagram illustrating one example of a map for defining a relation between a vehicle stop time rate and a time factor.

In FIG. 6, firstly, the calculation unit 130 calculates the auxiliary current amount on the basis of the signal indicating the power generation current value of the alternator 20 and the output signal of the battery current sensor 111 (step S101).

The calculation unit 103 then calculates the recent past vehicle stop time rate and the distant past vehicle stop time, on the basis of the respective output signals of the vehicle speed sensor 112 and the wheel speed sensor 113 (step S102). Here, the recent past vehicle stop time rate is set to, for example, a vehicle stop time rate of the past 10 min, and the distant past vehicle stop time rate is set to, for example, a vehicle stop time rate of the past 15 min.

If the period determined as the recent past (here 10 min) does not pass after the start (i.e. a time of ignition on) of the vehicle on which the charging control apparatus 100 is mounted, an initial value (e.g. 40%) is used as the recent past vehicle stop time rate. In the same manner, if the period determined as the distant past (here 15 min) does not pass after the start of the vehicle on which the charging control apparatus 100 is mounted, an initial value (e.g. 20%) is used as the distant past vehicle stop time rate.

The vehicle is considered to depart from an urban area in many cases. The aforementioned initial value is thus determined in view of the fact that the vehicle is relatively frequently stopped in the urban area. There is, however, a possibility that the vehicle leaves the urban area within the period determined as the distant past, from the start of the vehicle. Thus, the initial value of the distant past vehicle stop time rate is desirably determined to be smaller than the initial value of the recent past vehicle stop time. By virtue of such a configuration, for example, even if the initial value of the recent past vehicle stop time deviates from an actual value, an influence of the deviation can be reduced, and it is extremely useful in practice.

Then, the alternator power generation instruction voltage calculation unit 101 obtains a maximum vehicle stop time from the recent past vehicle stop time rate and the distant past vehicle stop time rate calculated by the calculation unit 103, and from a map for defining a relation between the vehicle stop time rate and a time factor, for example, illustrated in FIG. 3 (step S103).

More specifically, the alternator power generation instruction voltage calculation unit 101 specifies the time factor corresponding to the calculated recent past vehicle stop time rate, from the calculated recent past vehicle stop time rate and a map for defining the relation between the recent past vehicle stop rate and the time factor (in an upper part of FIG. 7). If the recent past vehicle stop rate is, for example, 0% (i.e. if the vehicle keeps running for the past 10 min), the time factor is 60 seconds. Alternatively, if the recent past vehicle stop rate is, for example, 25%, the time factor is 90 seconds. Alternatively, if the recent past vehicle stop rate is, for example, 60%, the time factor is 180 seconds.

In the same manner, the alternator power generation instruction voltage calculation unit 101 specifies the time factor corresponding to the calculated distant past vehicle stop time rate, from the calculated distant past vehicle stop time rate and a map for defining the relation between the distant past vehicle stop rate and the time factor (in a lower part of FIG. 7).

The alternator power generation instruction voltage calculation unit 101 then sets the value that is greater between the time factor specified on the basis of the recent past vehicle stop time rate and the time factor specified on the basis of the distant past vehicle stop time rate, as the maximum vehicle stop time.

The alternator power generation instruction voltage calculation unit 101 then obtains an ON condition of the damper control (step S104). Specifically, for example, the alternator power generation instruction voltage calculation unit 101 sets, as the ON condition of the damper control, a value that is obtained by adding 0.2 to a value that is obtained by dividing the product of the auxiliary current calculated in the process in the step S101 and the maximum vehicle stop time obtained in the process in the step S103 by one hundredth of the 5-hour time rate capacitance of the battery 30.

In other words, the ON condition of the damper control= (auxiliary current×maximum vehicle stop time)/(5-hour time rate capacitance/100)+0.2, wherein "0.2" is a constant associated with the idle stop control.

The alternator power generation instruction voltage calculation unit 101 then corrects the ON condition of the damper control (step S105). Specifically, the alternator power generation instruction voltage calculation unit 101 compares present SOC of the battery 30, for example, with SOC of 240 seconds before, for example, with a 10-second period, and corrects the ON condition of the damper control according to a comparison result.

The process in the step S105 will be explained with reference to FIG. 8A and FIG. 8B. FIG. 8A and FIG. 8B are diagrams illustrating one example of time variations of the SOC of the battery 30.

Until 240 seconds (or 4 min) pass after the start of the vehicle, there is no data about the SOC of 240 seconds before to be compared. Thus, the SOC of the start (i.e. the time of ignition on) of the vehicle and the present SOC are compared. Moreover, the process in the step S105 (or moreover, the charging control process) is performed after a lapse of one minute or more from the start of the vehicle.

Specifically, at a time point t in FIG. 8A, the alternator power generation instruction voltage calculation unit 101 firstly compares A1, which is a value of the SOC at the time point t1 (i.e. present SOC), with A0, which is a value of the SOC at the start of the vehicle, thereby obtaining a discharge-charge current differential value (or "A1−A0" here).

The alternator power generation instruction voltage calculation unit 101 then obtains the product of the obtained discharge-charge current differential value and "−0.5", and sets it as a correction term (or correction value) of the ON condition of the damper control. "−0.5" is an adaptive value according to, for example, specification of the vehicle, and this value is not limited.

The alternator power generation instruction voltage calculation unit 101 performs the same process with a 10-second period until 240 seconds pass after the start of the vehicle. In other words, the alternator power generation instruction voltage calculation unit 101 obtains (A2−A0) as the discharge-charge current differential value at a time point t+10 in FIG. 8A, and obtains −0.5×(A2−A0) as the correction term. The alternator power generation instruction voltage calculation unit 101 also obtains (A3−A0) as the discharge charge current differential value at a time point t+20 in FIG. 8A, and obtains −0.5×(A3−A0) as the correction term. The alternator power generation instruction voltage calculation unit 101 also obtains (A4−A0) as the discharge-charge current differential value at a time point T in FIG. 8A, and obtains −0.5×(A4−A0) as the correction term.

On the other hand, if 240 seconds or more pass after the start of the vehicle, the alternator power generation instruction voltage calculation unit 101 compares the present SOC with the SOC of 240 seconds before, thereby obtaining the discharge-charge current differential value.

Specifically, at a time point T in FIG. 8B, the alternator power generation instruction voltage calculation unit 101 firstly compares A8, which is a value of the SOC at the time point T (i.e. the present SOC), with A0, which is a value of the SOC of 240 seconds before, thereby obtaining the discharge-charge current differential value (or "A8−A0" here). The alternator power generation instruction voltage calculation unit 101 then obtains the product of the obtained discharge-charge current differential value and "−0.5", and sets it as the correction term of the ON condition of the damper control.

The alternator power generation instruction voltage calculation unit 101 performs the same process with a 10-second period. In other words, the alternator power generation instruction voltage calculation unit 101 obtains (A9−A5) as the discharge-charge current differential value at a time point T+10 in FIG. 8B, and obtains −0.5×(A9−A5) as the correction term. The alternator power generation instruction voltage calculation unit 101 also obtains (A10−A6) as the discharge charge current differential value at a time point T+20 in FIG. 8B, and obtains −0.5×(A10−A6) as the correction term. The alternator power generation instruction voltage calculation unit 101 also obtains (A11−A7) as the discharge-charge current differential value at a time point T+30 in FIG. 8B, and obtains −0.5×(A11−A7) as the correction term.

The alternator power generation instruction voltage calculation unit 101 adds the correction term obtained in the above manner to the ON condition of the damper control obtained in the process in the step S104, thereby correcting the ON condition of the damper control. The corrected ON condition of the damper control corresponds to the "threshold value S1" in FIG. 4. The description of "1.2% to 8%" indicates one example of a variation range of the threshold value S1.

Back in the flowchart in FIG. 6 again, after the process in the step S105, the alternator power generation instruction voltage calculation unit 101 obtains the feedback control target value (step S106). In the embodiment, as illustrated in FIG. 4, the feedback control target value matches an OFF condition of the damper control. Thus, in the embodiment, as a fundamental rule, a hysteresis width associated with the damper control is added to the corrected ON condition of the damper control obtained in the process in the step S105, by which the feedback control target value (and the OFF condition of the damper control) is obtained. The feedback control target value corresponds to the "threshold value S2" in FIG. 4.

Here, the hysteresis width will be explained with reference to FIG. 9. FIG. 9 is a diagram illustrating one example of a map for defining a relation between a change amount of the SOC of the battery 30 for the past 240 seconds and the hysteresis width associated with the damper control. The change amount of the SOC of the battery 30 for the past 240 seconds may be obtained by using the discharge-charge current differential value calculated when the correction term is obtained in the process in the step S105.

If the change amount of the SOC of the battery 30 for the past 240 seconds is less than or equal to −1%, the hysteresis width is 1.5%. In the same manner, if the change amount of the SOC of the battery 30 for the past 240 seconds is "−0.5%", "±0%", "+0.5%", and "greater than or equal to +1%", then, the hysteresis width is respectively "1.2%", "1.0%", "0.8%", and "0.5%".

As described above, in the embodiment, the hysteresis width when the battery 30 has a discharge tendency (i.e. the change amount of the SOC is negative) is set to be greater than the hysteresis width when the battery 30 has a charge tendency (i.e. the change amount of the SOC is positive).

As a result, in the embodiment, the discharge-charge tendency of the battery 30 can be reflected in the damper control. Specifically, if the battery 30 has the charge tendency, the feedback control target value (and the OFF condition of the damper control) approaches the corrected ON condition of the damper control. On the other hand, if the battery 30 has the discharge tendency, the feedback control target value (and the OFF condition of the damper control) deviates from the corrected ON condition of the damper control.

It is therefore possible to avoid that the damper control is excessively continued, regardless of circumstances in which the battery 30 is easily charged, such as, for example, in a case where the vehicle goes down a slope, or that the damper control is ended with insufficient charging, regardless of circumstances in which the battery 30 is easily discharged, such as, for example, in a case of traffic congestion.

By the way, if the feedback control target value is always set as the addition value between the corrected ON condition of the damper control and the hysteresis width associated with the damper control, the SOC of the battery 30 possibly becomes insufficient, for example, when a state of the vehicle suddenly transitions from a low load (e.g. small auxiliary current, small vehicle stop time rate) to a high load (e.g. large auxiliary current, large vehicle stop time rate).

Thus, in the embodiment, a lower limit (e.g. 3%) is provided for the feedback control target value, so as to prepare for the sudden transition to the high load. Therefore, if the addition value between the corrected ON condition of the damper control and the hysteresis width associated with the damper control is less than the lower limit of the feedback control target value, the feedback control target value (and the OFF condition of the damper control) is set as the lower limit.

In this case, there is a possibility that the hysteresis width becomes greater than a maximum value (1.5%) of the hysteresis width illustrated in FIG. 9. It has been found, however, by the study of the present inventor that the following advantageous effect can be obtained; namely, the SOC of the battery 30 is easily maintained at the feedback control target value by matching the OFF condition of the damper control with the feedback control target value. In other words, in the embodiment, if the addition value between the corrected ON condition of the damper control and the hysteresis width associated with the damper control is less than the lower limit of the feedback control target value, the hysteresis width is exceptionally allowed to be greater than the maximum value thereof.

Back in the flowchart in FIG. 6 again, after the process in the step S106, the alternator power generation instruction voltage calculation unit 101 performs charging control, on the basis of the corrected ON condition of the damper control (i.e.

the "threshold value S1" in FIG. 4) and the feedback control target value (i.e. the threshold value S2" in FIG. 4) (step S107). At this time, the alternator power generation instruction voltage calculation unit 101 specifies a range of the power generation voltage of the alternator 20 on the basis of the output signal of the drive mode calculation unit 102 (i.e. on the basis of the signal indicating any of acceleration, constant speed, and deceleration) (refer to FIG. 5), and determines the power generation instruction voltage of the alternator 20.

The "alternator power generation instruction voltage calculation unit 101" according to the embodiment is one example of the "changing device" according to the present invention. The "threshold value S1", the "threshold value S2" and the "discharge-charge current differential value" according to the embodiment are respectively one example of the "first threshold value" and the "past data associated with the power storage ratio" according to the present invention.

In the embodiment, the correction term of the ON condition of the damper control and the hysteresis width are determined on the basis of the change amount of the SOC of the past 240 seconds. 240 seconds is merely one example, and of course, it is not limited to this value.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A charging control apparatus mounted on a vehicle comprising a generator and a secondary battery that can store electric power generated by the generator, said charging control apparatus being configured in such a manner that when a power storage ratio, which is a ratio of a power storage amount of the secondary battery to full capacity, becomes less than or equal to a first threshold value, until the power storage ratio becomes a second threshold value, which is greater than the first threshold value, an upper limit of power generation voltage of the generator other than during deceleration of the vehicle is set to be higher than an upper limit of the power generation voltage other than during deceleration of the vehicle when the power storage ratio is greater than the second threshold value, said charging control apparatus comprising:

a changing device configured to change the second threshold value so that the second threshold value approaches the first threshold value when a discharge-charge tendency of the secondary battery based on past data associated with the power storage ratio is a charge tendency.

2. The charging control apparatus according to claim 1, wherein said changing device changes the second threshold value so that the second threshold value deviates from the first threshold value when the discharge-charge tendency is a discharge tendency.

* * * * *